(12) United States Patent
Kim et al.

(10) Patent No.: US 10,152,183 B2
(45) Date of Patent: Dec. 11, 2018

(54) THICK-FILM PATTERN STRUCTURE AND METHOD OF FORMING THE SAME

(71) Applicant: DONGWOO FINE-CHEM CO., LTD., Iksan-si, Jeollabuk-do (KR)

(72) Inventors: Yong Hwan Kim, Anseong-si (KR); Euk Kun Yoon, Hwaseong-si (KR); Yong Seok Choi, Jeonju-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 29 days.

(21) Appl. No.: 15/324,023

(22) PCT Filed: Jul. 1, 2015

(86) PCT No.: PCT/KR2015/006780
§ 371 (c)(1),
(2) Date: Jan. 5, 2017

(87) PCT Pub. No.: WO2016/006864
PCT Pub. Date: Jan. 14, 2016

(65) Prior Publication Data
US 2017/0160834 A1    Jun. 8, 2017

(30) Foreign Application Priority Data
Jul. 9, 2014    (KR) .................. 10-2014-0086245

(51) Int. Cl.
*G06F 3/045* (2006.01)
*G06F 3/044* (2006.01)
(Continued)

(52) U.S. Cl.
CPC .............. *G06F 3/044* (2013.01); *B05D 1/02* (2013.01); *B05D 1/18* (2013.01); *B05D 1/28* (2013.01);
(Continued)

(58) Field of Classification Search
CPC . G06F 3/044; G06F 2203/04103; B05D 1/28; B05D 1/18; B05D 1/32; B05D 1/02
See application file for complete search history.

(56) References Cited

U.S. PATENT DOCUMENTS

2006/0003480 A1    1/2006  Suzuki et al.
2009/0023102 A1    1/2009  Shimbori et al.
(Continued)

FOREIGN PATENT DOCUMENTS

KR    10-2003-0043756 A    6/2003
KR    10-2006-0048762 A    5/2006
(Continued)

OTHER PUBLICATIONS

International Searching Authority, International Search Report of PCT/KR2015/006780 dated Oct. 29, 2015.

*Primary Examiner* — Adam R. Giesy
(74) *Attorney, Agent, or Firm* — Sughrue Mion, PLLC (57) ABSTRACT

The present invention relates to a thick-film pattern structure formed by repeating a stacking process, specifically a thick-film pattern structure having a reduced taper angle at a pattern edge region after all layers of the same material are stacked in gradually reducing pattern widths, and a method of forming the thick-film pattern structure. The thick-film pattern structure according to the present invention comprises a thick-film pattern coating layer having a pattern width; and multiple thick-film pattern coating layers sequentially stacked on the thick-film pattern coating layer to have gradually reducing pattern widths at an edge region of the thick-film pattern coating layers, wherein the thick-film pattern coating layers provide a thick-film pattern having a stepped shape.

12 Claims, 5 Drawing Sheets

(51) Int. Cl.
*B05D 1/02* (2006.01)
*B05D 1/18* (2006.01)
*B05D 1/28* (2006.01)
*B05D 1/32* (2006.01)

(52) U.S. Cl.
CPC ...... *B05D 1/32* (2013.01); *G06F 2203/04103* (2013.01)

(56) References Cited

U.S. PATENT DOCUMENTS

| | | |
|---|---|---|
| 2009/0305503 A1 | 12/2009 | Sakamoto et al. |
| 2013/0082253 A1* | 4/2013 | Yamazaki ......... H01L 29/41733 257/43 |
| 2015/0027753 A1* | 1/2015 | Huang .................... G06F 3/041 174/251 |
| 2015/0111009 A1 | 4/2015 | Choi et al. |
| 2015/0298463 A1* | 10/2015 | Shintani ................. B41J 2/3351 347/56 |

FOREIGN PATENT DOCUMENTS

| | | |
|---|---|---|
| KR | 10-2008-0000736 A | 1/2008 |
| KR | 10-2009-0103830 A | 10/2009 |
| KR | 10-2013-0135051 A | 12/2013 |

\* cited by examiner

THICK-FILM PATTERN STRUCTURE AND METHOD OF FORMING THE SAME

CROSS REFERENCE TO RELATED APPLICATIONS

This application is a National Stage of International Application No. PCT/KR2015/006780 filed Jul. 1, 2015, claiming priority based on Korean Patent Application No. 10-2014-0086245 filed Jul. 9, 2014, the contents of all of which are incorporated herein by reference in their entirety.

TECHNICAL FIELD

The present invention relates to a thick-film pattern structure formed by repeating a stacking process. Particularly, the present invention relates to a thick-film pattern structure having a reduced taper angle at a pattern edge region after all layers of the same material are stacked in gradually reducing pattern widths, and a method of forming the thick-film pattern structure.

BACKGROUND ART

Recently, touch sensors are being widely applied to various electronic products such as mobile phones, personal digital assistants (PDAs), and handheld personal computers where technique for manufacturing capacitive touch sensors is most widely used.

The touch sensors are mostly a kind of capacitive touch sensors comprising a single electrode layer on a glass substrate.

Generally, conventional capacitive touch sensors comprise a touch sensing electrode layer made of indium tin oxide (ITO).

For example, the ITO is directly provided on a glass substrate by sputtering and then patterning is carried out to form a pattern of a touch sensing electrode layer.

The pattern of the touch sensing electrode layer includes an X-axis sensing electrode pattern and a Y-axis sensing electrode pattern, and one of them may include a conductive layer so as to form a bridge structure that one axis of the sensing electrode pattern passes across the other axis thereof.

Also, for insulation of the X-axis sensing electrode pattern and the Y-axis sensing electrode pattern, an insulating layer is formed at the position that the X-axis sensing electrode pattern and the Y-axis sensing electrode pattern crisscross with each other.

Figure 1:
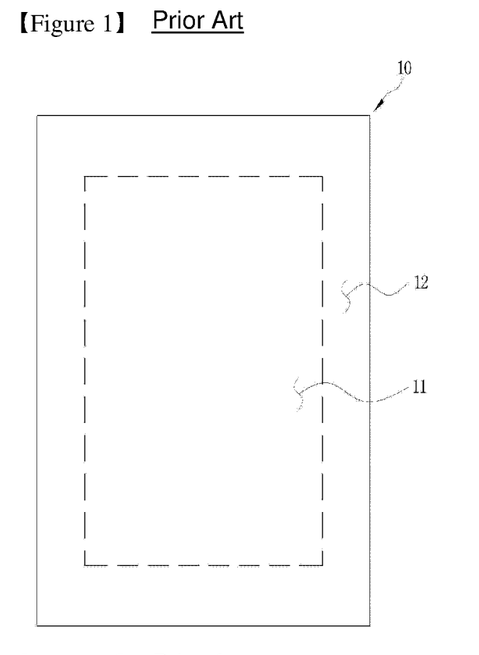
FIG. 1 is a top view of a general touch sensor.

Such a touch sensor includes, as shown in FIG. 1, a transparent substrate 10 having an active region 11 and an inactive region 12 corresponding to the periphery of the active region 11, and an electrode unit formed on one surface of the transparent substrate 10.

The transparent substrate 10 may act to provide a region in which the electrode unit for detecting a touch position is formed. The transparent substrate 10 should have force for supporting the electrode unit and transparency to allow a user to perceive images provided from an image display device.

Thus, the touch sensor may include the active region 11 and the inactive region 12 corresponding to the peripheral region of the active region 11.

The active region 11 refers to the part that a touch activity of the user is conducted, and corresponds to a display region allowing the user to visually monitor operation scenes of a device.

Also, the inactive region 12 is an unexposed region which is hidden by a bezel portion formed on the transparent substrate 10.

The bezel portion has a shield layer, a protective layer, and an insulating layer formed thereon with a predetermined thickness or more, which are disposed in the periphery of the active region 11, the shield layer for shielding light from a backlight, the protective layer for protecting a lower pattern, and the insulating layer for insulation from upper electrode lines.

These layers are formed to have a thick-film pattern with a predetermined thickness of 10-20 μm or more, and the thick-film pattern may have a desired thickness through repeated coating processes, not a single coating process.

Figure 2:
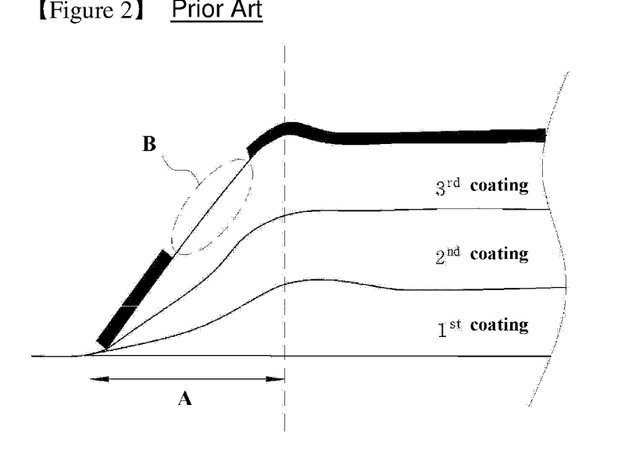
FIG. 2 is a diagram showing a cross-sectional structure of a thick-film pattern according to the prior art.

As shown in FIG. 2, when the thick-film pattern is formed by repeating at least three coating processes for stacking with the same pattern widths, an inclined angle at a taper region A of the thick-film pattern is greater than or equal to 20°, causing the flow of a photoresist, as shown in a region B, during a subsequent photolithography process.

The flow of the photoresist causes a disconnection and a defective pattern in a subsequent process.

In particular, the thickness and pattern width of the thick-film pattern are changed by a large inclined angle at the taper region A to cause quality defects in a device, thereby significantly reducing a yield.

Figure 3:
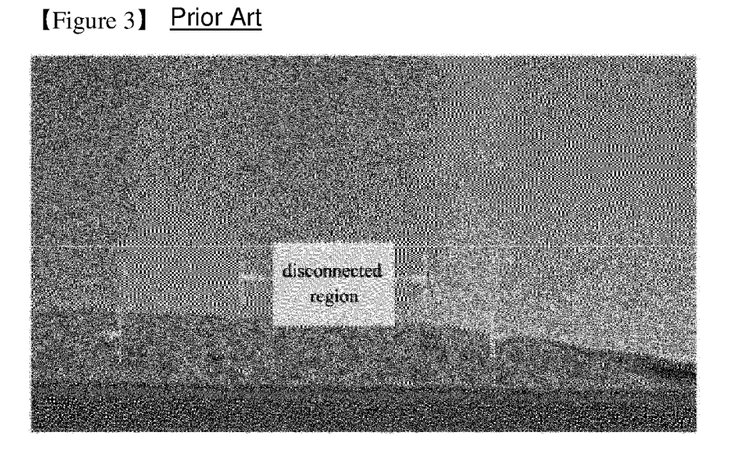
FIG. 3 is a photographic image showing a cross section of a disconnected region occurred during the formation of a thick-film pattern and a subsequent process according to the prior art.

FIG. 3 illustrates the occurrence of a disconnection in a subsequent process after the formation of a thick-film pattern according to the prior art as mentioned above.

Therefore, there is a demand for developing a new thick-film pattern structure and the preparation thereof to solve problems in the formation of the thick-film pattern according to the prior art.

DISCLOSURE OF INVENTION

Technical Problem

An object of the present invention is to provide a thick-film pattern structure having a reduced taper angle at a pattern edge region after all layers of the same material are stacked in gradually reducing pattern widths, and a method of forming the thick-film pattern structure.

Another object of the present invention is to provide a thick-film pattern structure that has a reduced taper angle at an edge region of a thick-film pattern used as a protective layer or an insulating layer, thereby solving problems in a subsequent process, such as the change of film thickness and pattern width and the occurrence of a disconnection, and a method of forming the thick-film pattern structure.

Still another object of the present invention is to provide a thick-film pattern structure formed by way of step-wise stacking that gradually reduces pattern widths, thereby preventing a photoresist from flowing down while a lithography process is performed on a thick-film pattern, and a method of forming the thick-film pattern structure.

Objects of the present invention are not limited to the aforementioned objects, and still other objects thereof not mentioned will be understandable by those skilled in the art from the following descriptions.

Technical Solution

According to one aspect of the present invention, there is provided a thick-film pattern structure, comprising: a thick-film pattern coating layer having a pattern width; and multiple thick-film pattern coating layers sequentially stacked on the thick-film pattern coating layer to have gradually reducing pattern widths at an edge region of the thick-film pattern coating layers, wherein the thick-film pattern coating layers provide a thick-film pattern having a stepped shape.

In the present invention, the reduced sizes of the gradually reducing pattern widths at an edge region of the thick-film pattern coating layers may be the same or may gradually decrease or increase according to the stacking sequence of the layers.

Also, the thick-film pattern coating layers may have the same thickness or gradually decreased or increased thicknesses according to the stacking sequence thereof.

The thick-film pattern may be formed by changing the reduced sizes of the gradually reducing pattern widths of the thick-film pattern coating layers and changing the thicknesses of the thick-film pattern coating layers.

The thick-film pattern composed of the thick-film coating layers may have a taper angle of 5° to 10° at the edge region thereof.

Also, the thick-film pattern composed of the thick-film coating layers may have an overall thickness of 30 μm to 35 μm.

The part of the stepped shape in the thick-film pattern may be disposed at a bezel region of a touch sensor.

The thick-film pattern may be any one of a shield layer for shielding light from a backlight, a protection layer for protecting a lower pattern, and an insulating layer for insulation from upper electrode lines.

According to another aspect of the present invention, there is provided a method of forming a thick-film pattern, comprising: coating a thick-film pattern-forming material using a mask having a pattern width; and repeatedly coating a thick-film pattern-forming material by sequentially using masks that provide gradually reducing pattern widths to form a thick-film pattern having a stepped shape at an edge region thereof.

In the present invention, the reduced sizes of the gradually reducing pattern widths of the masks to form a thick-film pattern having a stepped shape may be the same or different.

Also, the coating of the thick-film pattern-forming material may be performed such that each coating layer has the same or different thickness.

The gradually reducing pattern widths may form a taper angle of 5° to 10° at the edge region of the whole thick-film pattern obtained from the repeated coating of the thick-film pattern-forming material.

The thick-film pattern has an overall thickness of 30 μm to 35 μm.

The thick-film pattern-forming material may be any one of a shield layer-forming material for shielding light, a protection layer-forming material for protecting a lower pattern, and an insulation material for insulating from electrode lines.

Advantageous Effects

The thick-film pattern structure and the formation method thereof according to the present invention have the following effects:

First, it can provide a reduced taper angle at an edge region of a thick-film pattern after all layers are stacked.

Second, the thick-film pattern can be formed by a step-wise stacking method that gradually reduces pattern widths, thereby preventing a photoresist from flowing down while a lithography process is performed on the thick-film pattern.

Third, the taper angle at the edge region of the thick-film pattern can be reduced, thereby solving problems in a subsequent process, such as the change of film thickness and pattern width and the occurrence of a disconnection.

Fourth, an inclined angle at a taper region of the thick-film pattern can be reduced, thereby preventing the changes of film thickness and pattern width in the thick-film pattern, and improving a production yield.

BEST MODE

Hereinafter, preferred embodiments of a thick-film pattern structure and the formation method thereof according to the present invention will be described in detail as follows.

Features and advantages of the thick-film pattern structure and the formation method thereof according to the present invention will be apparent through the following detailed description for each of the embodiments.

Figure 4:
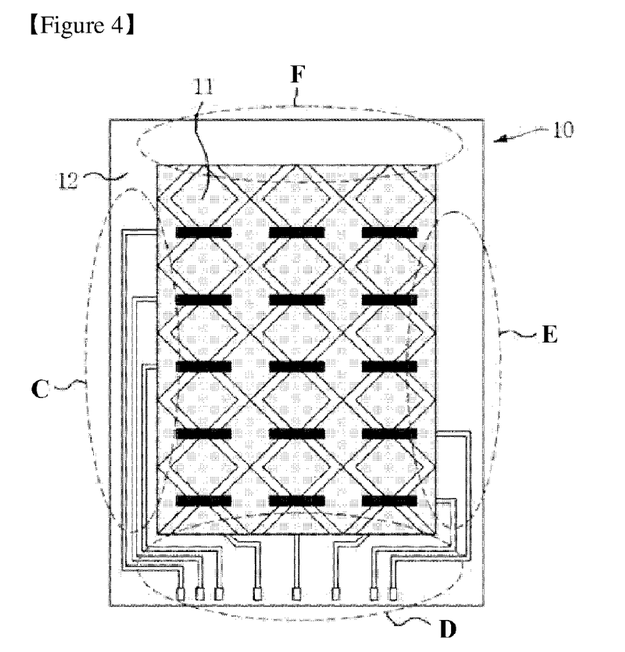
FIG. 4 is a diagram showing a configuration of a touch sensor that may be applicable in the present invention.
Figure 5:
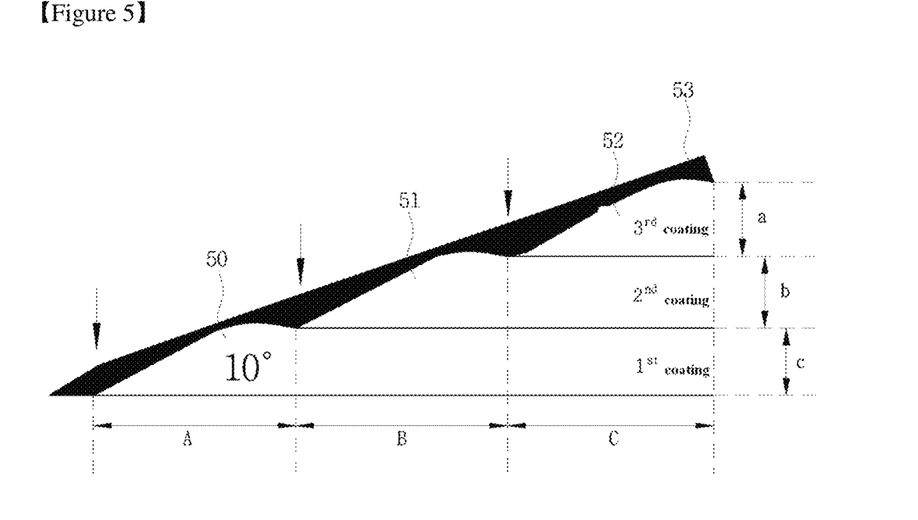
FIG. 5 is a cross-sectional view of the thick-film pattern according to the present invention.

FIG. 4 is a diagram of a configuration of a touch sensor that may be applicable in the present invention, and FIG. 5 is a cross-sectional view of the thick-film pattern according to the present invention.

The present invention is designed to reduce a taper angle at an edge region of a thick-film pattern used as a protective layer or an insulating layer to solve problems in a subsequent process, such as the change of film thickness and pattern width and the occurrence of a disconnection, by forming a thick-film pattern by way of step-wise stacking that gradually reduces pattern widths during repeated coating processes for forming a thick-film pattern.

The following description is provided for a touch sensor as an example that the thick-film pattern structure and the formation method thereof according to the present invention can be applied, but it is apparent that a device to which the technical aspect of the present invention is applied is not limited to the touch sensor.

That is, it may be applied in preparation of all other devices having a thick-film pattern formed by repeated coating processes.

As shown in FIG. 4, the touch sensor which can apply the thick-film pattern structure and the formation method thereof according to the present invention has an active region 11 that an electrode unit is disposed and an inactive region 12 corresponding to a peripheral region of the active region 11.

The inactive region 12 is an unexposed region which is hidden by a bezel portion formed on the transparent substrate 10. The bezel portion has a shield layer for shielding light from a backlight, a protective layer for protecting a lower pattern, and an insulating layer for insulation from upper electrode lines, which are disposed in the periphery of the active region 11 and have a predetermined thickness or more.

The transparent substrate 10 is preferably formed from, without limitation, polyethylene terephthalate (PET), polycarbonate (PC), polymethylmethacrylate (PMMA), polyethylenenaphthalate (PEN), polyethersulfone (PES), cycloolefin copolymer (COC), triacetylcellulose (TAC), polyvinyl alcohol (PVA), polyimide (PI), polystyrene (PS), K-resin containing biaxially oriented PS (BOPS).

The electrode unit may be formed on one surface of the transparent substrate 10. The electrode unit may include an electrode formed at the active region 11 on one surface of the transparent substrate 10, and an electrode wire formed on the inactive region 12 and connected to the edge of the electrode.

In the present invention, the position that the electrode unit of the touch sensor is formed is not limited to one surface of the transparent substrate 10, and the electrode unit may be formed on, for example, the other surface or both surfaces of the transparent substrate 10.

Also, the electrode may be made from a conductive polymer or a metal oxide.

The conductive polymer may include at least one of poly-3,4-ethylenedioxythiophene/polystyrene sulfonate (PEDOT/PSS), polyaniline, polyacetylene, and polyphenylenevinylene.

Also, the metal oxide may include indium tin oxide (ITO).

Besides the conductive polymer and the metal oxide, the electrode may be formed from, for example, a metal formed in a mesh pattern or metallic silver obtained by exposing/developing silver salt emulsion layer.

Also, the electrode wire may be formed from, for example, at least one of copper (Cu), aluminum (Al), gold (Au), silver (Ag), titanium (Ti), palladium (Pd), and chrome (Cr), but the present invention is not limited thereto.

Further, the electrode may be formed by a dry process, a wet process, or a direct patterning process.

In the present invention, the dry process includes sputtering and evaporation, the wet process includes dip coating, spin coating, roll coating, and spray coating, and the direct patterning process includes screen printing, gravure printing, and inkjet printing.

In FIG. 4, regions C, D, E, and F are disposed in the periphery of the active region 11, and represent a region that a shield layer for shielding light from a backlight, a protective layer for protecting a lower pattern, an insulating layer for insulation from upper electrode lines are mainly formed.

Of course, in the case where the thick-film pattern is formed at a region other than these regions, the thick-film pattern structure according to the present invention may be also applied.

FIG. 5 shows a cross-sectional structure of the thick-film pattern formed in any one region of regions C, D, E, and F in FIG. 4.

As shown in FIG. 5, the thick-film pattern according to the present invention includes a first thick-film pattern coating layer 50 having a first pattern width, a second thick-film pattern coating layer 51 formed on the first thick-film pattern coating layer 50 with a second pattern width reduced by a predetermined size from the first pattern width at the edge region, and a third thick-film pattern coating layer 52 formed on the second thick-film pattern coating layer 51 with a third pattern width reduced by a predetermined size from the second pattern width at the edge region.

Although the thick-film pattern structure is described herein through an example in which the thick-film pattern-forming material layers are formed by first, second, and third coating processes, the stacking number of coating layers may vary without limitation.

Further, reduced sizes A, B, and C of the gradually reducing pattern widths at the edge region of the thick-film pattern are preferably the same, but the reduced sizes may gradually decrease (A>B>C) or gradually increase (A<B<C).

Also, coating thicknesses a, b, and c for the thick-film pattern-forming material layers are preferably the same, but the coating thicknesses may gradually increase (a>b>c) or the coating thicknesses may gradually decrease (a<b<c).

Alternatively, the thick-film pattern structure may be formed by changing the reduced sizes of the gradually reducing pattern widths at the edge region of the thick-film pattern and changing the coating thicknesses of the thick-film pattern-forming material layers.

A taper angle of the thick-film pattern formed by the foregoing process ranges from 5° to 10°, allowing it to prevent a material 53 deposited in a subsequent process from flowing down.

For example, when patterning is performed by a lithography process, it is possible to solve problems caused by the flow of a photoresist, such as the reduction of a pattern width and the occurrence of a disconnection.

Also, in the case that an overall thickness of the thick-film pattern to be obtained is 10 μm or more, it is possible to prevent problems that may occur in a subsequent process, and in the case that the overall thickness of the thick-film pattern is very thick, for example, 30 μm-35 μm, it is possible to effectively reduce the taper angle at the edge region of the thick-film pattern.

The thick-film pattern may be any one of a shield layer for shielding light from a backlight, a protection layer for protecting a lower pattern, and an insulating layer for insulation from upper electrode lines.

The shield layer may be formed from a light absorbing material, or a material with a color correction function, without limitation. Therefore, other materials may be used to form the thick-film pattern for shielding.

The protective layer is intended to protect a lower pattern, and may be formed from a dielectric thin film, without limitation. Therefore, other materials may be used to form the thick-film pattern for lower pattern protection.

Further, the insulating layer may be formed from an oxide film or a nitride film, without limitation. Therefore, other materials may be used to form the thick-film pattern for insulation.

The thick-film pattern according to the present invention has a reduced taper angle at a pattern edge region thereof, which is obtained by varying pattern widths in several coating procedures of a thick-film pattern-forming material, and it can prevent a material deposited in a subsequent process from flowing down, thereby inhibiting the change of a film thickness, the reduction of a pattern width and the occurrence of a disconnection.

Such a thick-film pattern according to the present invention may be prepared according to the following process.

Figure 6:
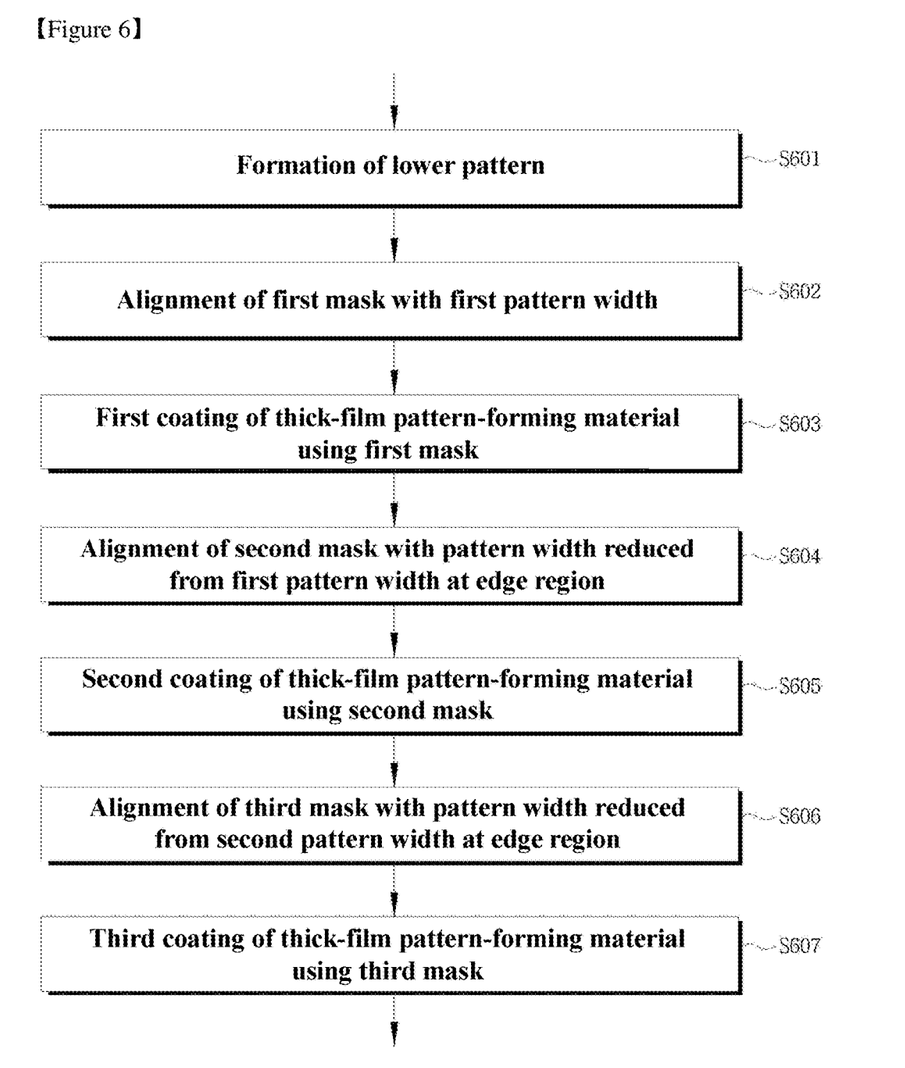
FIG. 6 is a flow chart showing the steps of a process for forming a thick-film pattern according to the present invention.

FIG. 6 is a flow chart showing the steps of a process for forming a thick-film pattern according to the present invention.

First, after forming a lower pattern (S601), a first mask having a first pattern width for forming a thick-film pattern is aligned (S602).

Then, first coating of a thick-film pattern-forming material is performed using the aligned first mask (S603).

Subsequently, a second mask having a pattern width reduced from the first pattern width at an edge region is aligned on a region coated with the thick-film pattern-forming material by the first coating (S604).

Then, second coating of a thick-film pattern-forming material is performed using the aligned second mask (S605).

Subsequently, a third mask having a pattern width reduced from the second pattern width at the edge region is aligned on the region coated with the thick-film pattern-forming material by the first and second coatings (S606).

Then, third coating of a thick-film pattern-forming material is performed using the third mask to form a thick-film pattern (S607).

Although it is described herein that the thick-film pattern-forming material layers are formed by first, second, and third coatings to form the thick-film pattern by way of illustration, the number of coating may vary without limitation.

Similarly, the thick-film pattern according to the present invention obtained from the above process may be any one of a shield layer for shielding light from a backlight, a protective layer for protecting a lower pattern, and an insulating layer for insulation from upper electrode lines.

The pattern sizes of the first, second and third masks may gradually reduce in the same or different degree, so as to provide pattern widths that gradually reduce at an edge region of the thick-film pattern.

Also, the coating of the thick-film pattern-forming material may be performed such that each coating layer has the same or different thickness.

In addition, the coating of the thick-film pattern-forming material may be performed according to various methods including, without limitation, dip coating, spin coating, roll coating, and spray coating, and other stacking methods may be contemplated.

The thick-film pattern structure obtained from the method according to the present invention, which applies a step-wise stacking method so as to provide reducing pattern widths, can prevent quality detects and appearance defects by disconnection and peeling-off of an electrode and a protective layer, even though its thick-film pattern has a thickness of 10 µm or more.

Figure 7A:
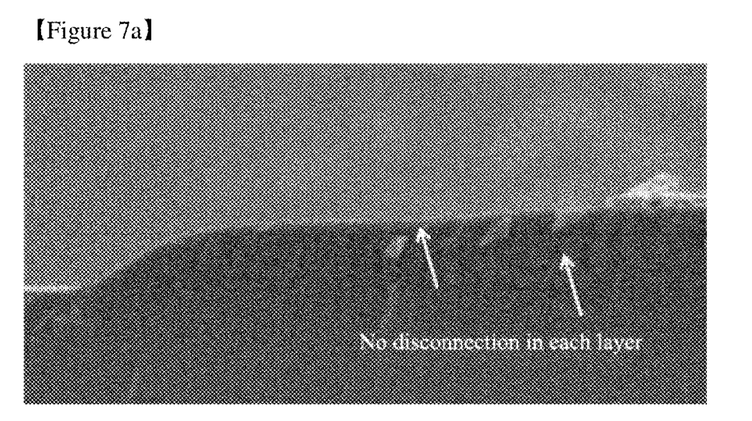
FIGS. 7a and 7b are cross-sectional photographic images of the thick-film pattern in the formation thereof and a subsequent process according to the present invention.
Figure 7B:
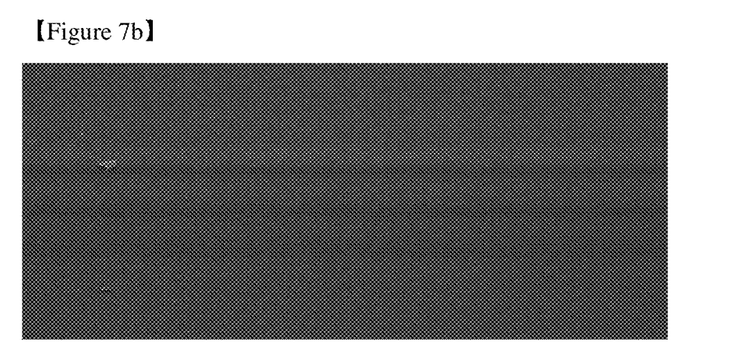

FIGS. 7a and 7b are cross-sectional photographic images of the thick-film pattern in the formation thereof and a subsequent process according to the present invention.

Although several coating methods are applied and thick/thin patterns coexist, it is possible to solve the discontinuity of the pattern or the breakage of the stacked pattern due to increased thickness.

Thus, the thick-film pattern structure obtained from the method according to the present invention, which forms a thick-film pattern by way of step-wise stacking that gradually reduce pattern widths through repeated coating processes, can provide a reduced taper angle at an edge region of the thick-film pattern and can inhibit the change of a film thickness and a pattern width, and the occurrence of a disconnection in a subsequent process.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS

50: First thick-film pattern coating layer
51: Second thick-film pattern coating layer
52: Third thick-film pattern coating layer

The invention claimed is:

1. A thick-film pattern structure, comprising:
a first thick-film pattern coating layer having a first pattern width; and
multiple thick-film pattern coating layers sequentially stacked on the first thick-film pattern coating layer to have gradually reducing pattern widths at an edge region of the thick-film pattern coating layers,
wherein the first and multi thick-film pattern coating layers provide a thick-film pattern having a stepped shape, and
wherein the thick-film pattern composed of the first and multiple thick-film coating layers has a taper angle of 5° to 10° at the edge region thereof.

2. The thick-film pattern structure according to claim 1, wherein reduced sizes of the gradually reducing pattern widths at the edge region of the first and multiple thick-film pattern coating layers are the same or gradually decrease or increase according to the stacking sequence of the layers.

3. The thick-film pattern structure according to claim 1, wherein the first and multiple thick-film pattern coating layers have the same thickness or gradually decreased or increased thicknesses according to the stacking sequence thereof.

4. The thick-film pattern structure according to claim 1, wherein the thick-film pattern is formed by changing reduced sizes of the gradually reducing pattern widths of the thick-film pattern coating layers and changing thicknesses of the thick-film pattern coating layers.

5. The thick-film pattern structure according to claim 1, wherein the thick-film pattern composed of the first and multiple thick-film coating layers has an overall thickness of 30 µm to 35 µm.

6. The thick-film pattern structure according to claim 1, wherein a part of the stepped shape in the thick-film pattern is disposed at a bezel region of a touch sensor.

7. The thick-film pattern structure according to claim 6, wherein the thick-film pattern is any one of a shield layer for shielding light from a backlight, a protective layer for protecting a lower pattern, and an insulating layer for insulation from upper electrode lines.

8. A method of forming a thick-film pattern, comprising:
(a) coating a thick-film pattern-forming material using a first mask having a first pattern width; and
(b) repeatedly coating the thick-film pattern-forming material by sequentially using masks that provide gradually reducing pattern widths to form a thick-film pattern having a stepped shape at an edge region thereof,
wherein the gradually reducing pattern widths form a taper angle of 5° to 10° at an edge region of a whole thick-film pattern obtained from the repeated coating of the thick-film pattern-forming material.

9. The method of forming a thick-film pattern according to claim 8, wherein reduced sizes of the gradually reducing pattern widths of the masks to form a thick-film pattern having a stepped shape are the same or different.

10. The method of forming a thick-film pattern according to claim 8, wherein the coatings of the thick-film pattern-forming material in (a) and (b) are performed such that each coating layer has the same or different thickness.

11. The method of forming a thick-film pattern according to claim 8, wherein the thick-film pattern has an overall thickness of 30 μm to 35 μm.

12. The method of forming a thick-film pattern according to claim 8, wherein the thick-film pattern-forming material is any one of a shield layer-forming material for shielding light, a protective layer-forming material for protecting a lower pattern, and an insulation material for insulating from electrode lines.

* * * * *